Apr. 10, 1923. 1,451,448
E. R. PELLING ET AL
MOTOR TRACTOR
Filed Sept. 2 1921 2 sheets-sheet 2
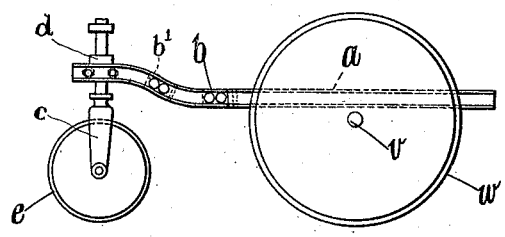
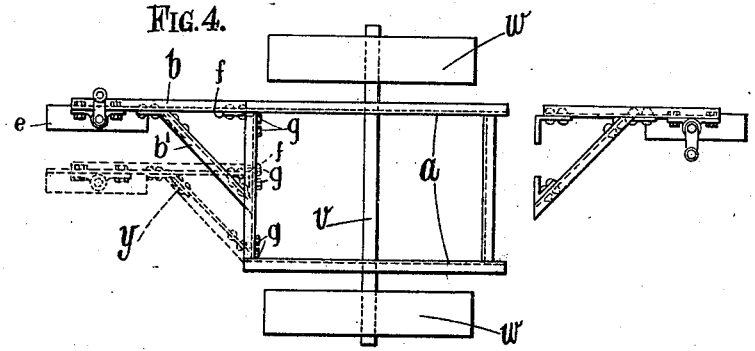

Patented Apr. 10, 1923.

1,451,448

UNITED STATES PATENT OFFICE.

ERNEST RICHARD PELLING, OF CROYDON, AND VICTOR ALEXANDER MATTICK, OF BECKENHAM, ENGLAND.

MOTOR TRACTOR.

Application filed September 2, 1921. Serial No. 498,023.

(GRANTED UNDER THE PROVISIONS OF THE ACT OF MARCH 3, 1921, 41 STAT. L., 1313.)

*To all whom it may concern:*

Be it known that we, ERNEST RICHARD PELLING, a subject of the King of Great Britain and Ireland, residing at the Engineer's House, Selsdon Park, Croydon, in the county of Surrey, England, and VICTOR ALEXANDER MATTICK, a subject of the King of Great Britain and Ireland, residing at 83 St. James Avenue, Beckenham, in the county of Kent, England, have invented a new and useful Improvement in Motor Tractors (for which we have obtained a patent in Great Britain, October 31, 1919, Patent No. 152,871), of which the following is a full and complete specification.

This invention relates to motor tractors and has for its object a construction which can be readily adapted either for the haulage of plows of the one-way type or for general haulage purposes.

Figure 1:
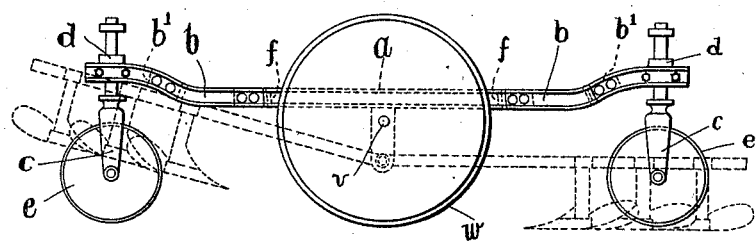
Figure 2:
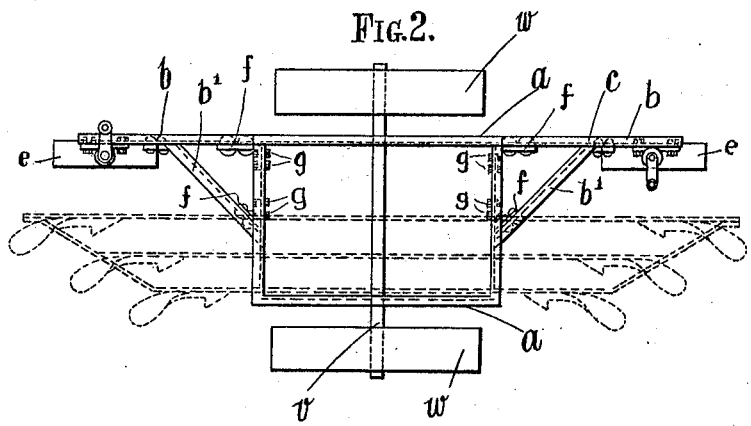

In motor tractors for one-way plows the merit of which arises from the avoidance of any turning movement at the headlands four essential features are necessary viz:—
(1) That the attachment of the plow must be at or about the axis of the driving wheels; (2) that two driving wheels must be employed spaced at such a distance apart as will provide room for the plow between them; (3) that two steering wheels must be employed one at each end of the frame (these in existing tractors of this type are for convenience located on one side of the machine); and (4) means must be provided for steering the tractor in either direction. Tractors embodying these features are well known but owing to the overall length of such machines they are not adapted for general haulage purposes as owing to their length they cannot be turned round in an ordinary road and would be difficult to manoeuvre in confined spaces. The object of the present invention is to enable tractors of this type to be easily and readily altered to make them suitable for general haulage purposes. We attain this end by the construction and arrangement of parts hereinafter described and claimed and shown in the accompanying drawings in which—
Figs. 1 and 2 are views in side elevation and plan respectively showing the tractor arranged for hauling one-way plows, and Figs. 3 and 4 are similar views showing the tractor arranged for use for general haulage purposes.

Throughout the views similar parts are marked with like letters of reference.

The tractor comprises essentially a central or main frame $a$ on which is mounted a transverse axle $v$ carrying two driving wheels $w$, $w$, the power unit, the variable speed and reverse gearing and the transmission gear all of which may be of any suitable type and as they form no part per se of the present invention call for no further description, and two secondary frames forming self-contained units of rigid construction each being adapted to carry a steering wheel $e$ which is mounted in a fork $c$ pivotally mounted in a socket $d$ carried by said frame. The secondary frames each comprise a beam $b$ and a stay $b'$ fixed in such angular relation to said beam that the width of the frame becomes such that it can be attached to the main frame so as to bring the steering wheel carried by it either at one side of the main frame or centrally in relation to said frame.

The secondary frames are adapted to be fixed to the main frame $a$ by means of angle brackets $f$ which are riveted or otherwise fixed to the beam and stay respectively and which are adapted to be secured to the transverse end members of the main frame by bolts $g$ so that said secondary frames are capable of being readily mounted on or dismantled from the main frame.

To adapt the tractor for general haulage purposes the secondary frames at each end of the main frame are detached and one of them is laid aside. The other is then re-attached by the bolts $g$ to the main frame in such a position as will bring the steering wheel into a central position in relation to the main frame as shown in Figs. 3 and 4.

To facilitate the shifting of one of the secondary frames from one position at the end of the main frame to another position at the same end of the main frame said secondary frame may be mounted in and supported by a suitable guide.

Any suitable steering mechanism is employed which will enable one or both of the steering wheels to be actuated.

What we claim is:—

In a motor tractor, a main frame supported by two driving wheels and adapted to carry the power unit and the transmission gear between said power unit and said driving wheels; and two secondary self-contained rigid frames adapted to be detachably mounted on the ends of the main frame on the same side thereof and each carrying a steering wheel, each of said secondary frames comprising a beam and a stay and the width of one of said secondary frames being such that it can be attached to the main frame to locate the steering wheel carried by it either at one side of the main frame or centrally in relation to said frame.

ERNEST RICHARD PELLING.
VICTOR ALEXANDER MATTICK.